United States Patent
Conner et al.

(10) Patent No.: US 9,970,452 B2
(45) Date of Patent: May 15, 2018

(54) FORWARD-SWEPT IMPELLERS AND GAS TURBINE ENGINES EMPLOYING THE SAME

(71) Applicant: HONEYWELL INTERNATIONAL INC., Morristown, NJ (US)

(72) Inventors: Richard David Conner, Peoria, AZ (US); Michael Todd Barton, Phoenix, AZ (US); Yoseph Gebre-Giorgis, Phoenix, AZ (US); Harry Lester Kington, Scottsdale, AZ (US); John Repp, Gilbert, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 223 days.

(21) Appl. No.: 14/623,761

(22) Filed: Feb. 17, 2015

(65) Prior Publication Data
US 2016/0238018 A1  Aug. 18, 2016

(51) Int. Cl.
*F04D 29/28* (2006.01)
*F01D 5/22* (2006.01)
(Continued)

(52) U.S. Cl.
CPC ............ *F04D 29/284* (2013.01); *F01D 5/225* (2013.01); *F01D 9/04* (2013.01); *F02C 3/09* (2013.01);
(Continued)

(58) Field of Classification Search
CPC . F04D 29/284; F04D 1/12; F04D 1/14; F04D 1/22; F04D 17/08; F04D 17/10;
(Continued)

(56) References Cited

U.S. PATENT DOCUMENTS 2,543,923 A   3/1951  Mixsell
2,658,338 A  11/1953  Leduc
(Continued)

FOREIGN PATENT DOCUMENTS

JP   11270491 A      10/1999
JP   2013147935 A     8/2013
JP   2014234729 A  * 12/2014

OTHER PUBLICATIONS

Mueller et al.; Multidisciplinary Optimization of a Turbocharger Radial Turbine; Jun. 2012, GT2012-68403; Proceedings of ASME Turbo Expo 2012.*
(Continued)

*Primary Examiner* — Jason Shanske
*Assistant Examiner* — Julian Getachew
(74) *Attorney, Agent, or Firm* — Lorenz & Kopf, LLP

(57) ABSTRACT

Embodiments of a forward-swept impeller are provide, as are embodiments of a gas turbine engine containing a forward-swept impeller. In one embodiment, the gas turbine engine includes a shaft and a forward-swept impeller mounted to the shaft. The forward-swept impeller includes, in turn, an inboard impeller section, an outboard impeller section circumscribing the inboard impeller section, and a plurality of hub flow paths extending over the forward-swept impeller from the inboard impeller section to the outboard impeller section. The plurality of hub flow paths each have a flow path exit that is tilted in a forward direction, as taken along a line tangent to the flow path exit.

10 Claims, 3 Drawing Sheets

(51) Int. Cl.
*F01D 9/04* (2006.01)
*F04D 29/32* (2006.01)
*F02C 3/09* (2006.01)

(52) U.S. Cl.
CPC .... *F05D 2250/38* (2013.01); *F05D 2260/941* (2013.01); *Y02T 50/671* (2013.01)

(58) Field of Classification Search
CPC .......... F04D 29/321; F01D 5/225; F01D 9/04; F01D 5/04; F01D 5/43; F01D 5/48; F01D 23/00; F02C 3/00; F02C 3/08; F02C 3/145; F05D 2220/32; F05D 2240/301; F05D 2240/12; F05D 2240/60; F05D 2250/38
USPC .................................................. 416/190, 185

See application file for complete search history.

(56) References Cited

U.S. PATENT DOCUMENTS

| | | | |
|---|---|---|---|
| 2,694,291 A | * | 11/1954 | Rosengart ................. F23R 3/50 |
| | | | 415/116 |
| 3,093,084 A | | 6/1963 | Derderian |
| 3,365,892 A | | 1/1968 | Derderian |
| 5,020,971 A | | 6/1991 | Greenspan |
| 2014/0127023 A1 | | 5/2014 | Herran et al. |
| 2014/0241901 A1 | | 8/2014 | Warikoo et al. |

OTHER PUBLICATIONS

Extended EP Search Report for Application No. 16155093.4-1610 dated Aug. 8, 2016.
Mueller, L. et al.; Multidisciplinary Optimization of a Turbocharger Radial Turbine; Proceedings of ASME Turbo Expo 2012, GT2012, Jun. 11-15, 2012, Copenhagen, Denmark; 1 Copyright © 2012 by ASME; GT2012-68403.

* cited by examiner

FORWARD-SWEPT IMPELLERS AND GAS TURBINE ENGINES EMPLOYING THE SAME

TECHNICAL FIELD

The present invention relates generally to gas turbine engines and, more particularly, to forward-swept impellers having increased flowering and creep resistance, as well as to gas turbine engines including forward-swept impellers.

BACKGROUND

Many gas turbine engine platforms include a centrifugal compressor or "impeller" positioned upstream of the engine's combustion section. An impeller typically includes a generally annular disk and a plurality of blades, which extend outward from the annular disk and which wrap tangentially around the disk in a twisting or spiral pattern. The impeller blades serve as airfoils and, during rotation of the impeller, force high pressure airflow from the impeller's forward or inducer portion to the impeller's aft or exducer portion. As airflow travels from the inducer portion to the exducer portion under the influence of centrifugal forces, the air is compressed and its pressure increased. Hot, compressed airflow is expelled by the impeller's exducer portion in a radially-outward direction and supplied to the gas turbine engine's combustion section, mixed with fuel, and ignited to produce combustive gases. The combustive gases are then directed through one or more air turbines downstream of the combustion section to produce power and to drive further rotation of the impeller.

An impeller is typically exposed to considerable temperature gradients and centrifugal forces during engine operation. Advancements in impeller design, cooling, and materials have brought about significant improvements in impeller temperature tolerances. Nonetheless, impellers remain prone to physical deformation at higher engine speeds and operating temperatures. For example, during engine operation, a condition referred to as "flowering" can occur wherein the impeller's exducer portion deflects in a forward direction such that the back disk and the outer blade ends close inwardly toward the impeller centerline in a manner somewhat similar to the petals of a closing flower. While flowering is a temporary condition occurring while the impeller is operating at high temperatures and under significant centrifugal loads, flowering can be highly problematic. Specifically, flowering can degrade allotted clearances and potentially result in rubbing between the impeller and the surrounding static infrastructure of the engine, such as a shroud positioned around the impeller. Over time, the forward-biased deformation of the impeller can become permanent, a condition referred to as "axial creep." Axial creep can culminate in the gradual forward movement or "walking" of the impeller over its service life, which may again reduce allotted engine clearances, result in undesired friction between engine components, or otherwise negatively impact engine performance.

It is thus desirable to provide impellers having an increased resistance to deformation (flowering and axial creep) when subjected to highly elevated temperatures and rotational speeds characteristic of gas turbine engine applications. Ideally, such a deformation-resistant impeller could be produced in a relatively straightforward and cost effective manner utilizing conventionally-known manufacturing techniques. It is also desirable to provide embodiments of a gas turbine engine containing such a deformation-resistant impeller and, perhaps, having a reduced length and weight. Other desirable features and characteristics of the present invention will become apparent from the subsequent Detailed Description and the appended Claims, taken in conjunction with the accompanying Drawings and the foregoing Background.

BRIEF SUMMARY

Embodiments of a gas turbine engine containing a forward-swept impeller are provided. In one embodiment, the gas turbine engine includes a shaft and a forward-swept impeller mounted to the shaft. The forward-swept impeller includes an inboard impeller section, an outboard impeller section circumscribing the inboard impeller section, and a plurality of hub flow paths extending over the forward-swept impeller from the inboard impeller section to the outboard impeller section. The plurality of hub flow paths each have a flow path exit that is tilted in a forward direction, as taken along a line tangent to the flow path exit.

In another embodiment, the gas turbine engine includes a shaft and an impeller mounted to the shaft. The impeller includes an inboard impeller section having a first center of gravity (CG), and an outboard impeller section circumscribing the inboard impeller section and having a second CG. The outboard impeller section is tilted in a forward direction proximate an outer diameter of the forward-swept impeller such that the second CG is offset from the first CG in a forward direction by a predetermined amount $\Delta X_{OFF}$ reducing deformation of the forward-swept impeller during operation of the gas turbine engine.

Embodiments of a forward-swept impeller for usage within a gas turbine engine are further provided. In one embodiment, the forward-swept impeller includes an inboard impeller section, an outboard impeller section circumscribing the inboard impeller section, and a plurality of hub flow paths extending from the inboard impeller section to the outboard impeller section. The plurality of hub flow paths each have a flow path exit that is tilted in a forward direction, as taken along a line tangent to the flow path exit.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

Figure 1:
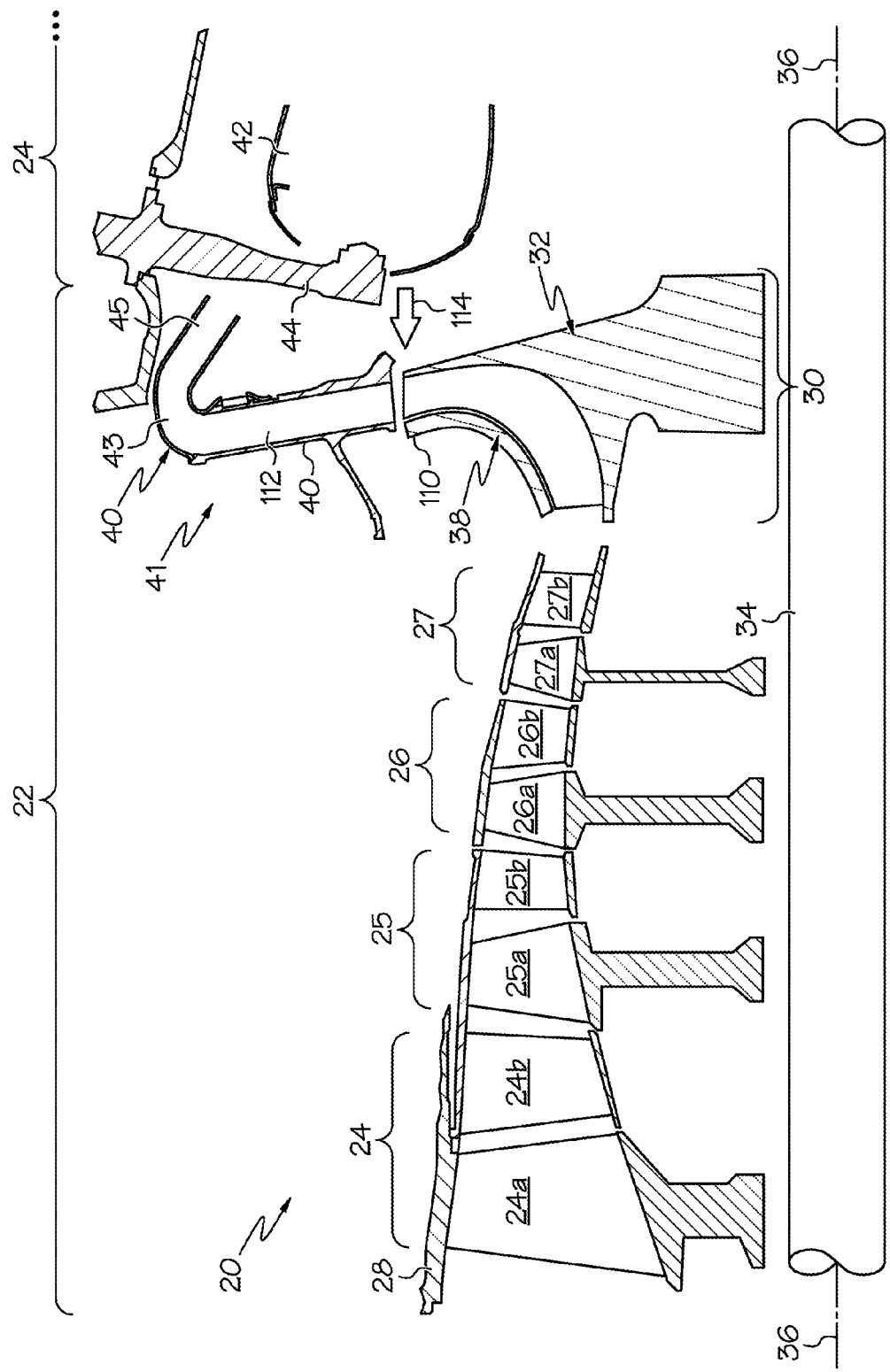
FIG. 1 is a schematic illustrating an exemplary gas turbine engine (partially shown) including a combustor section and a compressor section, which contains a forward-swept impeller (shown in a cross-sectional flattened or "meridional" view), as illustrated in accordance with an exemplary embodiment of the present invention.

FIG. 1 is a generalized schematic of a portion of a gas turbine engine (GTE) 20, as illustrated in accordance with an exemplary embodiment of the present invention. The illustrated portion of GTE 20 includes a compressor section 22 and a combustor section 24 (partially shown), which is positioned downstream of compressor section 22. The non-illustrated portions of GTE 20 further include an intake section upstream of compressor section 22, a turbine section downstream of combustor section 24, and an exhaust section downstream of the turbine section. As illustrated in FIG. 1, GTE 20 is provided by way of non-limiting example only; it will be understood embodiments of GTE 20 and other gas turbine engines containing forward-swept impellers of the type described herein can vary widely in structure, function, and application. Furthermore, while GTE 20 will often be deployed on an aircraft as a propulsive engine, an Auxiliary Power Unit (APU), or a turboshaft engine, GTE 20 is not limited to such applications and can be deployed onboard other vehicles (e.g., watercraft and land vehicles) or utilized in non-vehicle applications, such as industrial power generation applications.

Compressor section 22 includes a number of axial compressor stages, which are disposed in flow series. In the illustrated exemplary embodiment, specifically, compressor section 22 includes four axial compressor stages 24-27. Each axial compressor stage 24-27 includes a rotor "(a)" followed by a stator "(b)." For example, the first axial compressor stage 24 contains a first rotor 24(a) and a first stator 24(b), the second axial compressor stage 25 contains a second rotor 25(a) and a second stator 25(b), and so on. Axial compressor rotors 24(a)-27(a) are each essentially bladed wheels, which are mounted to a common shaft 34 and which rotate along therewith about rotational axis 36 during operation of GTE 20. By comparison, stators 24(b)-27(b) are essentially bladed rings, which are affixed to the static engine infrastructure and do not rotate during engine operation. An engine casing 28, which has a generally tubular shape and which may be made-up of one or more individual pieces or shrouds, surrounds or circumscribes axial compressor stages 24-27. The final axial compressor stage 27 feeds into a radial compressor stage 30 containing a centrifugal compressor or "impeller" 32 (shown in a flattened cross-sectional or "meridional" view). As will be described in detail below, impeller 32 has a forward-swept geometry near its outer radial end or outlet and is consequently more fully referred to herein as "forward-swept impeller 32."

Forward-swept impeller 32 is mounted to shaft 34 utilizing a rotationally-fixed coupling (e.g., a curvic-type coupling or a friction coupling) such that impeller 32 and shaft 34 rotate in unison about rotational axis 36 of GTE 20. As noted above, axial compressor rotors 24(a)-27(a) may also be mounted to shaft 34 or to a different shaft included in GTE 20 (not shown), depending upon the spool count of the engine. In alternative embodiments, compressor section 22 may include additional axial compressor stages and/or an intake fan positioned upstream of compressor stages 24-27, which may be mounted to shaft 34 or another shaft coaxial therewith. In other embodiments, GTE 20 may lack axial compressor stages and rely solely on impeller 32 for compression purposes. As further shown in FIG. 2, forward-swept impeller 32 is surrounded by a generally annular or conical shroud 38, which helps guide airflow from the inlet or inducer end of impeller 32 to the outlet or exducer end thereof. The pressurized airflow discharged from impeller 32 is received by a diffuser 40 included in a diffusion system 41, which is positioned radially outboard of impeller 32. Shroud 38 can be produced to have a forward-swept geometry or a forward tilt near its downstream end generally matching the contour of the blades of forward-swept impeller 32, as described below. Similarly, as further described below, diffuser 40 can be produced to have a forward tilt similar the exducer end of impeller 32 or, instead, may extend in a purely radial or non-tilted direction. Diffusion system 41 also includes a bend 43 and a deswirl portion 45, which guides airflow received from impeller 32 into combustion section 24 during operation of GTE 20, as described below.

When receiving compressed airflow from impeller 32, diffusion system 41 directs the pressurized airflow into combustion section 24 and, specifically, into at least one combustor 42 contained therein (partially shown in FIG. 1). A number of fuel injectors 44 (one shown) project into combustor 42 and, during operation of GTE 20, inject fuel into combustor 42 for mixture with the compressed air supplied by compressor section 22. The fuel-air mixture is then ignited, and the resulting combustive gasses heat rapidly, expand, and flow from combustion section 24 into a non-illustrated turbine section. Within the turbine section, the combustive gasses flow through a number of turbines to drive the rotation thereof. Rotation of the turbines drives further rotation of shaft 34, forward-swept impeller 32, and axial compressor rotors 24(a)-27(a). Finally, the combustive gasses are expelled from the non-illustrated turbine section and, in certain cases, directed through a nozzle to generate forward thrust. The power output of GTE 20 may be utilized in a variety of different manners depending upon whether GTE 20 assumes the form of a turbofan, turboprop, turboshaft, turbojet, or another type of engine.

Figure 2:
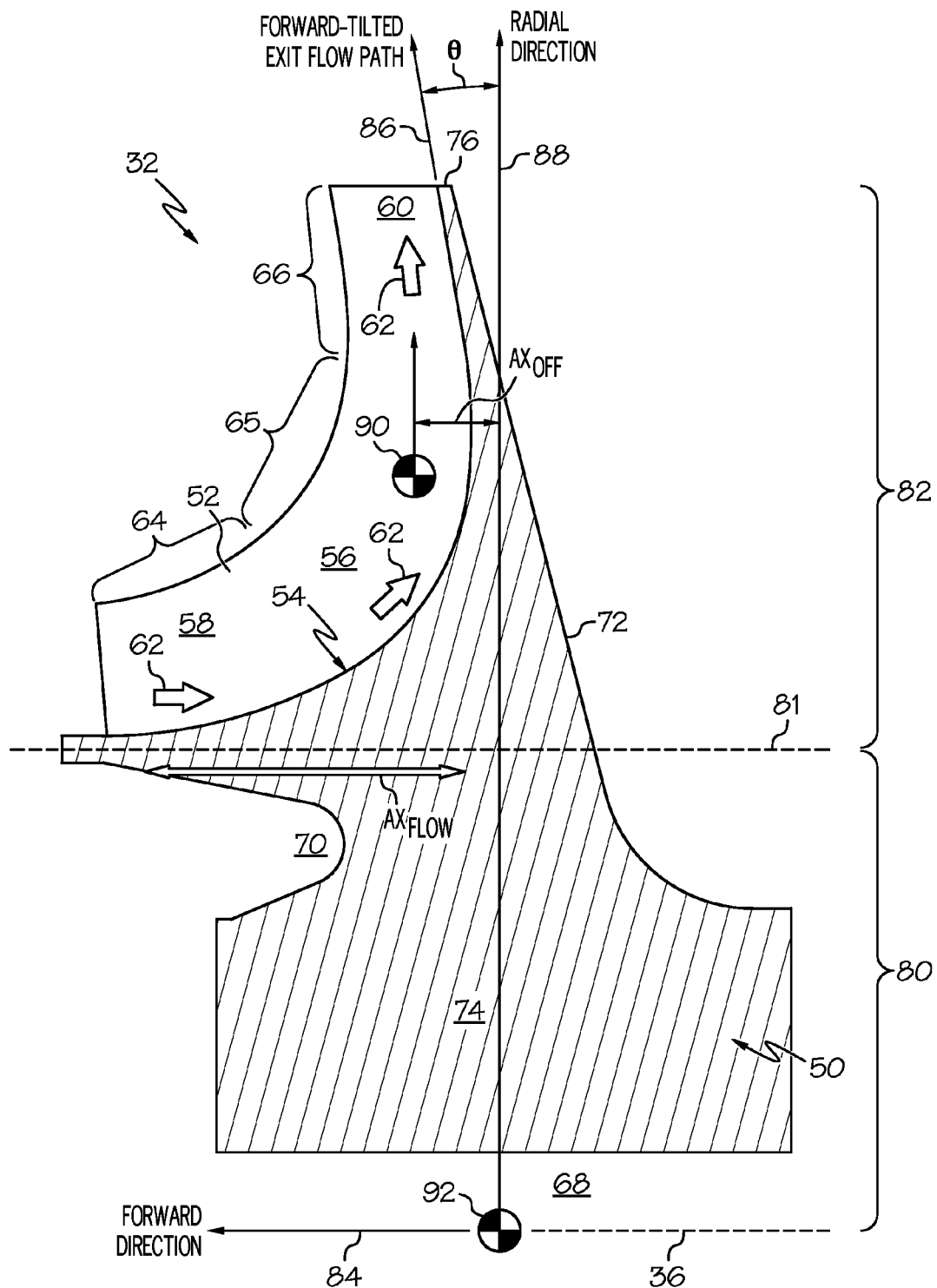
FIG. 2 is a more detailed cross-sectional flattened or "meridional" view of the forward-swept impeller shown in FIG. 1 and illustrated in accordance with an exemplary embodiment of the present invention.

FIG. 2 is a more detailed cross-sectional flattened or "meridional" view of forward-swept impeller 32 (partially shown). Impeller 32 includes a central disk 50 from which a plurality of blades 52 extends. While only a limited portion of forward-swept impeller 32 is shown, it will be appreciated that central disk 50 is generally axisymmetric around rotational axis 36 and the centerline of impeller 32. Further, while only a single blade 52 can be seen in FIG. 2, it will be appreciated that forward-swept impeller 32 includes a relatively large of number of blades 52, which are integrally formed with or otherwise attached to disk 50 and angularly spaced thereabout. Blades 52 extend outwardly from central disk 50 and wrap tangentially around disk 50 in a twisting or spiral pattern. The portion of disk 50 to which blades 52 attach is commonly referred to as the "hub" and is identified in FIG. 2 by reference numeral "54." Collectively, hub 54 and blades 52 define a number of hub flow paths 56, which extend across impeller 32 and which each have an inlet/entrance 58 and an outlet/exit 60. One such hub flow path 56 is shown in FIG. 2 wherein reference numeral "58" is utilized to denote both the entrance of the flow path and the inlet of impeller 32, while reference numeral "60" is utilized to denote both the exit of the flow path and the outlet of impeller 32. The direction of airflow along the illustrated flow path 56 is generally represented in FIG. 2 by arrows 62.

With continued reference to FIG. 2, the region of forward-swept impeller 32 along which an initial portion of each flow path 56 extends, as measured along hub 54, is referred herein to as the "inducer portion" of impeller 32 and identified in FIG. 2 by reference numeral "64." The region of forward-swept impeller 32 along which an intermediate portion of each flow path 56 extends, as measured along hub 54, is referred herein to as the "knee portion" of impeller 32 and identified in FIG. 2 by reference numeral "65." Finally, the portion of impeller 32 along which the final portion each flow paths 56 extends is referred herein to as the "exducer portion" and identified by reference numeral "66." The precise boundaries between inducer portion 64, knee portion 65, and exducer portion 66 will vary amongst embodiments; however, it will often be the case that inducer portion 64 and exducer portion 66 each extend for about 30±5% of the total flow path length, while knee portion 65 extends for about 40±5% of the total flow path length.

A bore 68 extends through central disk 50 of forward-swept impeller 32 along rotational axis/centerline 36; the term "bore," as appearing herein, referring to a central opening or longitudinal channel extending through an impeller, regardless of the manner in which the opening or channel is formed. When impeller 32 is installed within GTE 20 (FIG. 1), bore 68 receives shaft 34 therethrough, while inboard impeller section 80 is joined to shaft 34 in a rotationally-fixed manner utilizing, for example, a curvic-type attachment. In the illustrated example, impeller 32 also includes a forward pocket 70 formed in central disk 50 at a location radially inboard of hub 54 for the weight reduction purposes. If desired, material may also be material from the backface 72 of central disk 50 for additional weight reduction and/or a cavity or void can be formed in the inner annular body 74 of disk 50. Disk 50 may taper downward in thickness when moving toward the outer diameter (OD) or outer rim 76 of forward-swept impeller 32. Forward-swept impeller 32 can include various other structural features in alternative embodiments in addition to or in lieu of the features shown in FIG. 2; e.g., impeller 32 can include cooling channels, interfaces between mating pieces, and/or truncated "splitter" blades interspersed with blades 52 in further embodiments, to list but a few examples.

As a point of emphasis, forward-swept impeller 32 can be fabricated utilizing any currently-known or later-developed manufacturing process and may be produced from any number of pieces. For example, in certain embodiments, central disk 50 and blades 52 can be integrally formed by machining a single, monolithic block of material (commonly referred to as a "blisk"). In other embodiments, central disk 50 and blades 52 can be independently fabricated and subsequently joined together utilizing, for example, an interlocking interface, a bonding technique, a metallurgical consolidation technique, or the like. Such a manufacturing approach is advantageous in that it may enable or facilitate fabrication of blades 52 from a single crystal superalloy. Moreover, central disk 50 itself can be produced from multiple pieces, which are joined or clamped together to yield, for example, an axially-split impeller. In this latter case, each blade 52 may include separately fabricated forward and aft portions, which cooperate to form a continuous blade when impeller 32 is fully assembled or consolidated. Generally, then, any manufacturing technique suitable for producing forward-swept impeller 32 can be employed; and, as an advantage associated with the present invention, forward-swept impeller 32 can be fabricated in a relatively straightforward manner utilizing conventionally-known manufacturing techniques capable of imparting impeller 32 with its unique forward-swept geometry, as described below.

Impeller 32 can be conceptually divided into an inboard impeller section 80 and an outboard impeller section 82, which extends around or circumscribes impeller section 80. The interface between inboard impeller section 80 and outboard impeller section 82 is demarcated by dashed line 81 in the cross-section of FIG. 2 with the understanding that this interface will have an annular or ring-shaped geometry when impeller 32 is viewed in three dimensions. Notably, annular interface 81 is set at the free ring radius of impeller 32; that is, annular interface 81 is concentric with rotational axis 36 and has a radius equal to the free ring radius. The term "free ring radius," as appearing herein, is defined in accordance with its standard industry meaning (a mathematical definition) and, in essence, corresponds to the point along the radius of impeller 32 inboard of which the circumferentially continuous impeller material will support the hoop stress generated by its body forces and additional forces and outboard of which the circumferentially continuous impeller material adds to the stress state of the material below it. As can be seen in FIG. 2, outboard impeller section 82 contains or encompasses blades 52 and flow paths 56 in their entirety, as well as a majority of the backface 72 of central disk 50 by surface area. By comparison, inboard impeller section 80 contains or encompasses bore 68 in its entirety, as well as a majority of central disk 50 by volume. Inboard impeller section 80 and outboard impeller section 82 are fixedly coupled and will often be integrally formed as a single piece or, perhaps, by two or more axially-mating pieces if impeller 32 is produced to have an axially-split form factor. In further embodiments, impeller sections 80 and 82 can be separately produced and subsequently metallurgically consolidated or otherwise fixedly joined.

In the context of this document, an impeller is considered "forward-swept" when the hub flow path is tilted in a forward direction (identified in FIG. 2 by arrow 84) at the flow path exit point with the exclusion of any fillets, radii, or rounded-off portions that may be present thereat. Stated more specifically, an impeller is considered "forward-swept" when a line tangent to the outermost radial edge of each of the flow path exits has a forward-leaning tilt or inclination (again excluding any fillets or radii). This may be more fully appreciated by referring to FIG. 2 wherein a line tangent to the hub flow path is identified by arrow 86 and referred to herein as the "hub exit tangent line." As can be seen, exducer portion 66 of impeller 32 is imparted with a forward-swept geometry such that hub exit tangent line 86 it tilted in a forward direction (has a non-zero forward component). As a corollary, an impeller having a hub exit tangent line extending outwardly in purely a radial direction or an aft-leaning direction is not considered "forward swept" in the present context, regardless of whether the disk backface has a forward slant as may be the case when the impeller disk tapers downward in thickness when moving toward the OD of the impeller. Although not shown in FIG. 2, additional hub exit tangent lines can also be drawn to the other, non-illustrated flow path exits of impeller 32 with each hub exit tangent line likewise having a forward tilt or lean, as more fully described below.

Due to the forward tilt of outboard impeller section 66 along hub flow paths 56, the hub exit tangent line 86 forms an acute angle θ with a radius 88 of impeller 32 (that is, an axis extending perpendicular to rotational axis 36). The term "acute angle" is defined herein to include any angle less than 90° and having a non-zero value. The value of angle θ will vary amongst embodiments depending upon a number of factors. However, it is generally preferred that angle θ is sufficiently large to maximize the benefits described below with respect to impeller deformation resistance and engine length reduction, while also being sufficiently small to minimize any aerodynamic penalty resulting from the forward-swept design of the impeller. In one embodiment, angle θ ranges between 1 and 20° and, more preferably, between 5 and 15°. In further embodiments, angle θ may be less than or greater than the aforementioned ranges.

Due to the manner in which hub flow paths 56 are tilted in an axially-forward direction at their respective exits, the center of gravity or mass (CG) of outboard impeller section 82 may be shifted axially forward relative to the CG of impeller 32 considered as a whole (referred to herein as the "part CG"); although this need not be the case is all embodiments. Once again, this may be more fully appreciated by referring to FIG. 2 wherein the CG of outboard impeller section 82 is represented by symbol 90, while the part CG is represented by symbol 92. The axial offset of outboard impeller section CG 90 relative to the part CG 92 is indicated by double-headed arrow "$AX_{OFF}$." The axial CG offset ($AX_{OFF}$) will vary amongst embodiments; however, by way of non-limiting example, the axial CG offset is at least 10% of the axial length of hub flow paths 56, as taken along rotational axis 36 (identified in FIG. 2 by double-headed arrow "$AX_{FLOW}$"). The axial CG offset ($AX_{OFF}$) of forward-swept impeller 32 can also be appreciated by comparing impeller 32 to the conventional impeller 100 shown in FIG. 3, which includes an outboard impeller section 102 and an inboard impeller section 104 separated by a boundary or interface 106. As can be seen, conventional impeller 100 lacks a forward-swept geometry; a line 108 tangent to the outer edge of the hub flow path exit extends in a purely radial direction with no forward component. Relatedly, the CG of outboard impeller section 102 may not be shifted forward relative to the CG of its inboard impeller section 104. When subjected to elevated temperatures and high rotational speeds, conventional impeller 100 may consequently be prone to flowering and axial creep, as described in the foregoing section entitled "BACKGROUND." In contrast, forward-swept impeller 32 is resistant to such physical deformation for the reasons explained below.

Referring once again to FIG. 2, forward-swept impeller 32 may be resistant to deformation (flowering and axial creep) due, at least in part, to the manner in which the CG 90 of outboard impeller section 82 is shifted forward relative to the part CG 92. Without being bound by theory, it is believed that such a design results in a rebalancing of centrifugal loads exerted on forward-swept impeller 32 during engine operation. Specifically, due to the forward-shifted CG 90 of outboard impeller section 82, exducer portion 66 is urged to expand in a radially outward and aft direction when impeller 32 is subject to elevated temperatures and high rotational speeds during engine operation. This expansive, aftward force is antagonistic to the forces exerted on forward-swept impeller 32 in a generally forward direction, which can otherwise cause impeller flowing and gradual axial creep. The forward-swept geometry of impeller 32 and, specifically, the forward lean or tilt of outboard impeller section 66 (as defined by the forward-tilted orientation of the hub exit tangent lines) thus serves to lessen or eliminate the propensity of impeller 32 to deflect or deform in a forward direction under engine operating conditions. The end result in an impeller that is highly resistant to flowering, axial creep, and possibly other types of deformation. Such favorable attributes may prolong the service life of forward-swept impeller 32 and enable impeller 32 to operate under more demanding conditions (higher temperatures and/or rotational speeds), which would be unsuitable for conventional impellers, such as impeller 100 shown in FIG. 3. Additionally, as a possible secondary benefit, the axial dimension of impeller 32 may be reduced near the impeller OD relative to conventional impellers.

Forward-swept impeller 32 can be employed in various different gas turbine engine platforms. In certain cases, forward-swept impeller 32 can be utilized in place of a conventional impeller with little to no changes in engine architecture. In this case, forward-swept impeller 32 can be installed within a service-run engine as a substitute for an existing impeller having a similar overall shape, but lacking a forward-swept geometry. However, in preferred embodiments, forward-swept impeller 32 is installed within a gas turbine engine having an architecture uniquely modified or adapted to impeller 32. This may be more fully appreciated by referring once again to FIG. 1 and, specifically, to impeller shroud 38 and diffuser 40 of diffusion system 41. Addressing first shroud 38, it can be seen that the downstream portion 110 of impeller shroud 38 is imparted with a forward-swept geometry substantially matching or conformal with the forward-swept geometry of exducer portion 66 of impeller 32. Specifically, downstream portion 110 of shroud 38 extends in a radially-outward direction and then bends or curls slightly back toward a forward direction before terminating adjacent the outlet 60 of impeller 32. In this manner, shroud 38 can better conform to the contour of the downstream ends of blades 52, which may be tilted in a forward direction as shown in FIG. 2.

Figure 3:
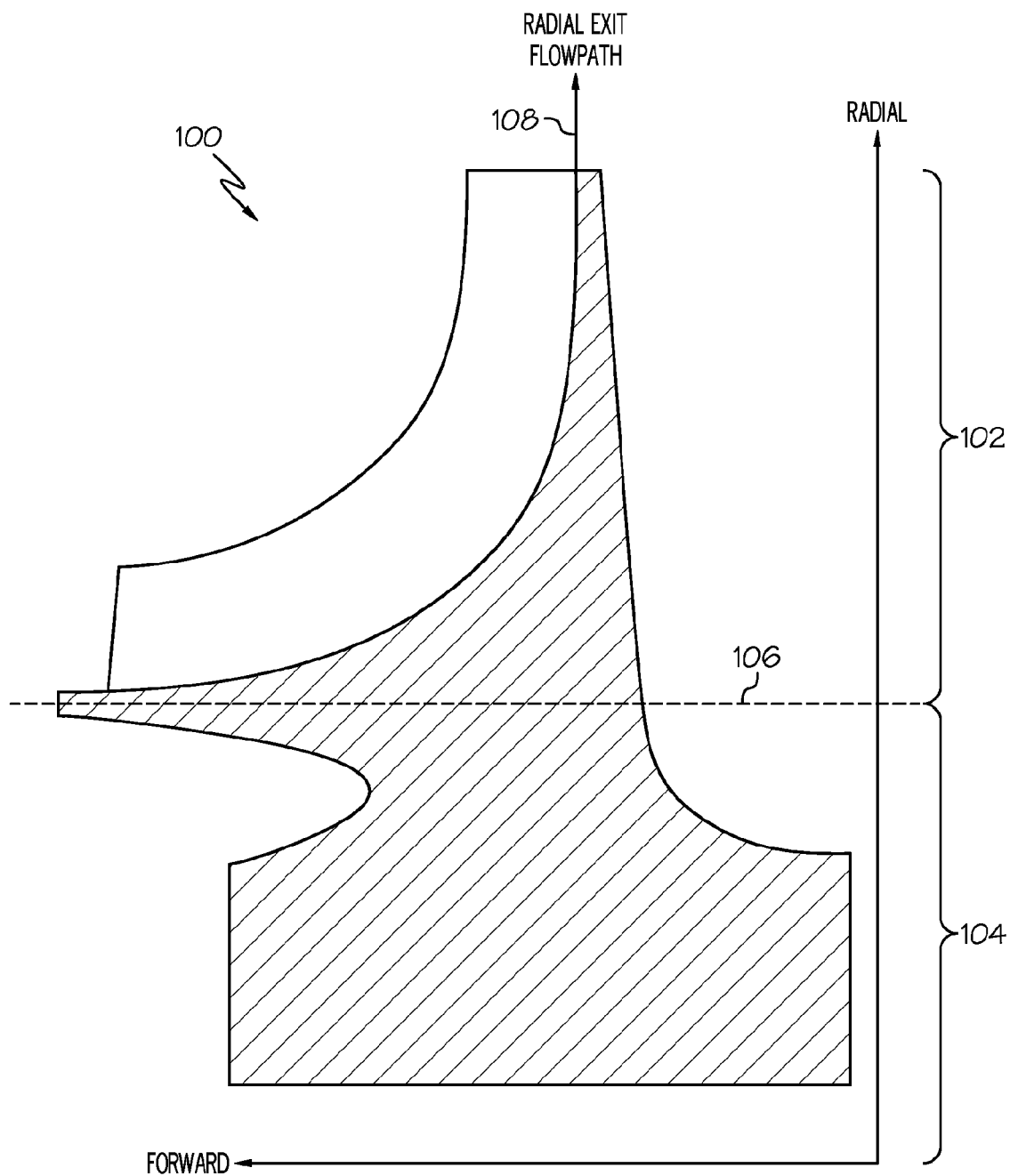
FIG. 3 is a cross-sectional flattened or "meridional" view of a conventional impeller, which is provided for purposes of comparison with the forward-swept impeller shown in FIGS. 1 and 2.

Turning to diffuser 40 of diffusion system 41, it can also be seen that the flow passage 112 of diffuser 40 is tilted in an axially-forward direction along its length by an angle substantially equivalent to angle θ identified in FIG. 2; the term "substantially equivalent," as appearing herein, denoting a disparity of less than 2°. By imparting diffuser 40 with such a forward tilt, airflow can smoothly transition from impeller 32 into diffuser 40. Additionally, the forward tilt of diffuser 40 frees a small amount of additional space to enable the components aft of impeller 32 (combustor 42 and fuel injectors 44) to be shifted in a forward direction (represented in FIG. 1 by arrow 114) enabling a reduction in the overall length and weight of GTE 20. Notably, due to the forward-swept geometry of impeller 32 and the consequent relocation of the outlet of impeller 32 in a forward direction, it may be possible to shift the components of GTE 20 aft of impeller 32 (combustor 42 and fuel injectors 44) in a forward direction and bring about a reduction in engine length even when diffuser 40 has a more conventional, radially-straight orientation or shape. Thus, while it is preferred that GTE 20 includes a forward-tilted diffuser, such as diffuser 40, alternative embodiments of GTE 20 can be produced to include a conventional, non-tilted diffuser. In either case, the primary benefit of providing a deformation-resistant impeller is achieved, which may allow GTE 20 to operate at greater rotational speeds, higher temperatures, and with greater overall efficiency. Additionally, in either case, the diffuser flow passage may have a leading edge axially offset from the forward-most point of the impeller flow passages in a forward direction, as generally shown in FIG. 3.

The foregoing has thus provided embodiments of forward-swept impeller having an increased resistance to deformation (flowering and axial creep) when subjected to highly elevated temperatures, significant temperature gradients, and rotational speeds characteristic of operation with in a gas turbine engine. More specifically, in at least some embodiments, the forward-swept impeller is produced to include an outer geometry having a forward sweep or lean (as defined by the forward-tilted orientation of the hub exit tangent lines) near the exducer end, outlet, or OD thereof. In certain embodiments, the forward-swept geometry of the impeller is further designed such that the CG of the outer radial portion or outboard portion of the impeller is shifted forward relative to the CG of inner radial portion or inboard portion of the impeller or, more generally, relative to the CG of the impeller as a whole. As a result of this forward-shifted CG, an expansive force acts on the exducer section of the impeller in a generally aftward direction during engine operation (when centrifugal forces and elevated temperature gradients act on the impeller) thereby counteracting, in whole or in part, forces that would otherwise urge flowering and axial creep of the impeller. Advantageously, embodiments of the forward-swept impeller can be produced in a relatively straightforward manner utilizing conventionally-known manufacturing techniques. The forward-swept geometry of the impeller may also enable the axial dimension of the impeller to be reduced near its OD and, perhaps, to enable an overall reduction in engine length. The foregoing has also provided embodiments of gas turbine engines including a forward-swept impeller and, in certain cases, a forward-swept shroud and/or a forward-tilted diffuser.

While multiple exemplary embodiments have been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended Claims.

What is claimed is:

1. A gas turbine engine, comprising:
   a shaft having a rotational axis; and
   a forward-swept impeller mounted to the shaft, the forward-swept impeller comprising:
     an inboard impeller section;
     an outboard impeller section circumscribing the inboard impeller section, the outboard impeller section joined to the inboard impeller section along an annular interface concentric with the rotational axis, the annular interface having a radius equal to a free ring radius of the forward-swept impeller; and
     a plurality of hub flow paths defined by the outboard impeller section each of the plurality of hub flow paths having an axial length of $AX_{FLOW}$, as taken along the rotational axis;
   wherein each of the plurality of hub flow paths has a flow path exit that is tilted in a forward direction, as taken along a line tangent to the flow path exit and that forms an acute angle $\theta$ with a radius of the forward-swept impeller;
   wherein the forward-swept impeller has a first Center of Gravity (CG) considered as a whole, the outboard impeller section has a second CG, and the second CG is offset from the first CG in the forward direction by an axial offset $AX_{OFF}$ that is at least 10% $AX_{FLOW}$.

2. The gas turbine engine of claim 1 wherein the acute angle $\theta$ has a value between 5 and 15 degrees.

3. The gas turbine engine of claim 1 further comprising a diffuser positioned radially outboard of the forward-swept impeller and receiving airflow discharged therefrom, the diffuser having a flow passage tilted in the forward direction by an angle equivalent to $\theta$.

4. The gas turbine engine of claim 1 further comprising a shroud circumscribing the forward-swept impeller and having a downstream portion curling in the forward direction.

5. The gas turbine engine of claim 1 further comprising a diffuser positioned radially outboard of the forward-swept impeller and configured to receive compressed airflow discharged therefrom, the diffuser having a flow passage with a leading edge axially offset in the forward direction from a forward-most point of the plurality of hub flow paths.

6. The gas turbine engine of claim 1 wherein the forward-swept impeller further comprises:
   a central disk having a backface; and
   a plurality of blades extending from central disk;
   wherein the inboard impeller section encompasses a volumetric majority of the central disk, while the outboard impeller section encompasses a majority of the backface of the central disk by surface area.

7. A forward-swept impeller, comprising:
   an inboard impeller section;
   an outboard impeller section circumscribing the inboard impeller section, the outboard impeller section joined to the inboard impeller section along an annular interface concentric with a rotational axis of the forward-swept impeller, the annular interface having a radius equal to a free ring radius of the forward-swept impeller; and
   a plurality of hub flow paths defined by the outboard impeller section, each of the plurality of hub flow paths having an axial length of $AX_{FLOW}$, as taken along the rotational axis;
   wherein the forward-swept impeller has a first Center of Gravity (CG) considered as a whole, the outboard impeller section has a second CG, and the second CG is offset from the first CG in a forward direction by an axial offset $AX_{OFF}$ that is at least 10% $AX_{FLOW}$; and
   wherein each of the plurality of hub flow paths has a flow path exit that is tilted in the forward direction, as taken along a line tangent to the flow path exit and forming an acute angle $\theta$ with a radius of the forward-swept impeller intersecting the first CG.

8. The forward-swept impeller of claim 7 wherein the acute angle $\theta$ has a value between 5 and 15 degrees.

9. The forward-swept impeller of claim 7 further comprising:
   a central disk having a backface; and
   a plurality of blades extending from central disk;
   wherein the inboard impeller section encompasses a volumetric majority of the central disk, while the outboard impeller section encompasses a majority of the backface of the central disk by surface area.

10. The forward-swept impeller of claim 7 wherein, as considered in cross-section as taken along a plane containing the rotational axis, the plurality of hub flow paths is located entirely forward of a plane orthogonal to the rotational axis and containing the radius of the forward-swept impeller intersecting the first CG.

* * * * *